United States Patent [19]

Niggemeyer

[11] Patent Number: 4,922,396
[45] Date of Patent: May 1, 1990

[54] DC-DC CONVERTER

[76] Inventor: Gert G. Niggemeyer, Steinbecker Mühlenweg 95, D-2110 Buchholz i.d.N, Fed. Rep. of Germany

[21] Appl. No.: 223,518

[22] Filed: Jul. 25, 1988

[30] Foreign Application Priority Data

Jul. 24, 1987 [DE] Fed. Rep. of Germany ....... 3724590

[51] Int. Cl.⁵ .......................................... H02M 3/335
[52] U.S. Cl. .......................................... 363/21; 363/56
[58] Field of Search ................ 363/20, 21, 56, 60, 363/61, 97

[56] References Cited

U.S. PATENT DOCUMENTS

| | | | |
|---|---|---|---|
| 4,027,200 | 5/1977 | Sahara et al. | 363/20 X |
| 4,437,147 | 3/1984 | Takamura et al. | 363/61 |
| 4,642,743 | 2/1987 | Padcliffe | 363/56 X |
| 4,675,796 | 6/1987 | Gautherin et al. | 363/20 |
| 4,782,437 | 11/1988 | Nishiyama et al. | 363/21 X |

FOREIGN PATENT DOCUMENTS

| | | | |
|---|---|---|---|
| 0147979 | 11/1980 | Japan | 363/21 |
| 0162769 | 9/1984 | Japan | 363/21 |

Primary Examiner—Patrick R. Salce
Assistant Examiner—Kristine Teckman
Attorney, Agent, or Firm—Cohen, Pontani & Lieberman

[57] ABSTRACT

The pulse generator of a DC-DC converter is operated in single-ended mode and the secondary winding (W2, 1) which is connected to the bridge rectifier (BR) is also used for the demagnetization of the transformer (XFMR). A terminal (A, C) of the secondary winding (W2, 2) is connected through a capacitance C1 to a connection point (G) of low potential.

18 Claims, 3 Drawing Sheets

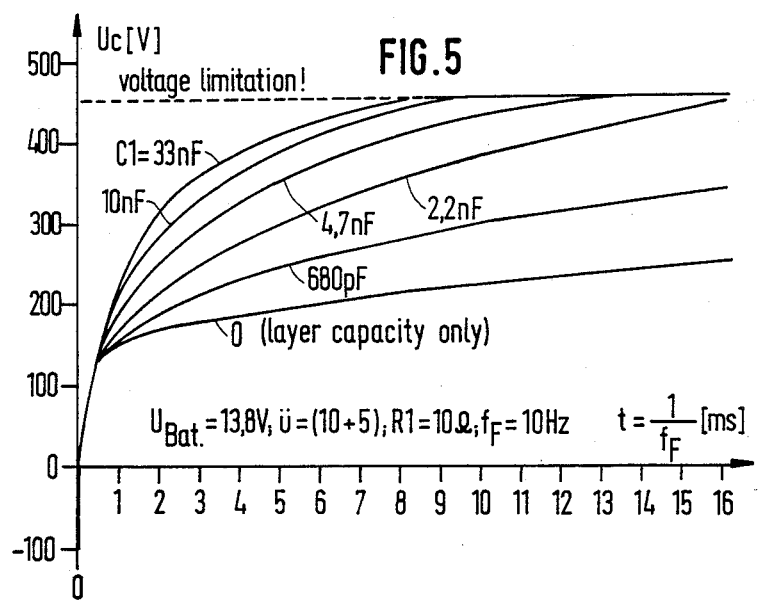
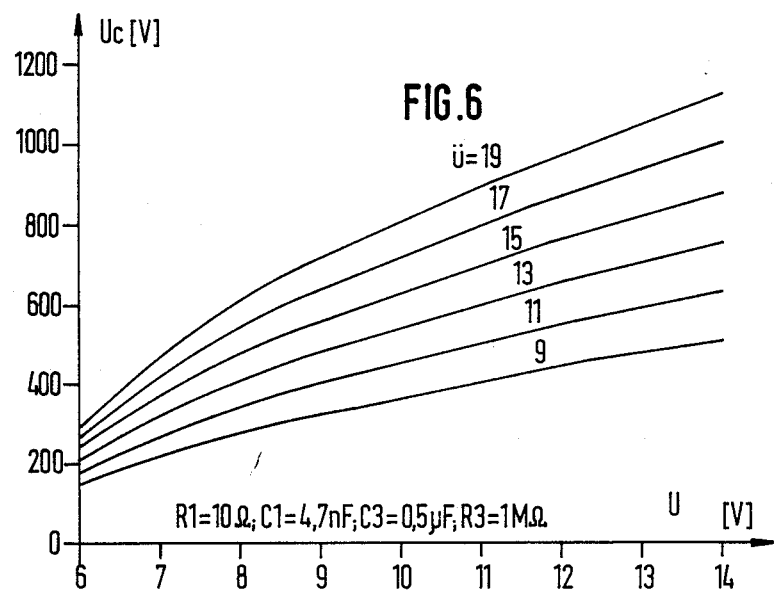

DC-DC CONVERTER

FIELD OF THE INVENTION

The present invention relates to DC-DC converters and, in particular, to such a converter which is fed by a pulse generator and efficiently provides a high voltage output under a range of load conditions.

BACKGROUND OF THE INVENTION

DC-DC converters which output high voltage pulses in response to pulses of substantially lower potential are known in the art. Such a converter, used in the supply of a high voltage capacitor ignition device for internal combustion engines, is for example discussed in my earlier U.S. Pat. No. 4,696,280. The pulse generator of that DC-DC converter is controlled by a pulse-width modulator and includes two power transistors acting in push-pull operation on separate primary transformer windings. A full-wave bridge rectifier connected to the secondary transformer winding supplies a high DC voltage to an ignition capacitor which forms the charging capacitor.

When, in the use of such a high-voltage capacitor ignition device, the sparking is intensified and the maximum spark frequency at the same time increased then considerably more power is passed through the capacitor ignition device, as a result of which correspondingly greater heat must be dissipated. When a capacitor ignition device of relatively small dimensions is arranged in a correspondingly small housing, as is common, the additionally required heat dissipation becomes a problem.

In such a capacitor ignition device the DC-DC converter periodically charges the charging capacitor, at the frequency of the required train of sparks, each time from zero potential to a predetermined charge voltage. Initially the discharged charging capacitor constitutes a short circuit for the DC-DC converter after which, with increasing charging voltage, the load of the converter decreases since the load impedance represented by the charging capacitor is increasing and, therefore, the initial mismatch between the DC-DC converter and the load impedance is gradually reduced.

With increasing spark frequency, the charge voltage of the charging capacitor decreases. With a large transformer stepup ratio of about 25, the continuous mismatch between load impedance and the DC-DC converter also impairs and decreases the operating efficiency of the converter. In practice, carefully dimensioned capacitor ignition devices have an efficiency of only about 45% at low output, which decreases by approximately a third or more—namely to below 30%—at maximum spark frequency and work. A low efficiency at high output, however, correspondingly requires the dissipation of large amounts of heat which, in turn, limits the maximum power of the capacitor ignition device and unnecessarily burdens the power supply of the automobile or other vehicle electrical system.

It is accordingly the desideration of the invention to provide an improved DC-DC converter for generating, in response to a low voltage pulse train, a pulsed high voltage output with variable matching to the varying load impedance of the charging capacitor and thereby substantially increase the operating efficiency of the converter.

SUMMARY OF THE INVENTION

A DC-DC converter constructed in accordance with the invention, which operates in single-ended mode, includes a secondary transformer winding connected to the bridge rectifier and which is also utilized for demagnetization of the transformer, as a result of which the voltage pulse produced upon demagnetization is also utilized for charging of the charging capacitor. Solely by this first measure in accordance with the invention the theoretical stepup ratio between the primary and secondary windings of the transformer is increased by a factor of 2.4. In addition, by connecting a terminal of the secondary winding through a capacitance to a circuit connection of low potential, a further increase in the stepup ratio by a factor of 1.75 is obtained. These two enhancements accordingly result in an increase in the stepup ratio by an overall factor of about 4.2. Since at the start of the charging of the charging capacitor, when the latter therefore represents practically a short circuit to the output of the bridge rectifier, substantially only the transformer stepup ratio (which is established by the ratio of the number of turns) is active, the match to the load resistance of the bridge rectifier as established by the charging capacitor is improved. Moreover, because with an increase in the charging voltage at the charging capacitor the stepup ratio is continuously and therefore uninterruptedly increased by the aforementioned factors, a good match to the continuously increasing load resistance of the bridge rectifier is obtained in this operating region as well.

In addition, by reason of this increase in effective stepup ratio, a considerable increase in the charge voltage at the charging capacitor can be achieved, and therefore utilized, when (for example) only relatively low supply voltages are available on the primary side of the DC-DC converter.

Further objects, features and advantages of the present invention will be more fully appreciated by reference to the following detailed description of presently preferred, but nonetheless illustrative, embodiments in accordance with the present invention when taken in conjunction with the accompanying drawings.

BRIEF DESCRIPTION OF THE DRAWINGS

In the drawings, wherein similar reference characters denote similar elements throughout the several views:

FIG. 5 graphically illustrates the charge voltage present on the charging capacitor as a function of time, plotted for a variety of different capacitances; and FIG. 6 graphically illustrates the charge voltage obtainable on the charging capacitor as a function of the supply voltage present on the primary side of the DC-DC converter, plotted for a variety of theoretical stepup ratios of the transformer.

DETAILED DESCRIPTION OF THE PREFERRED EMBODIMENTS

Figure 1:
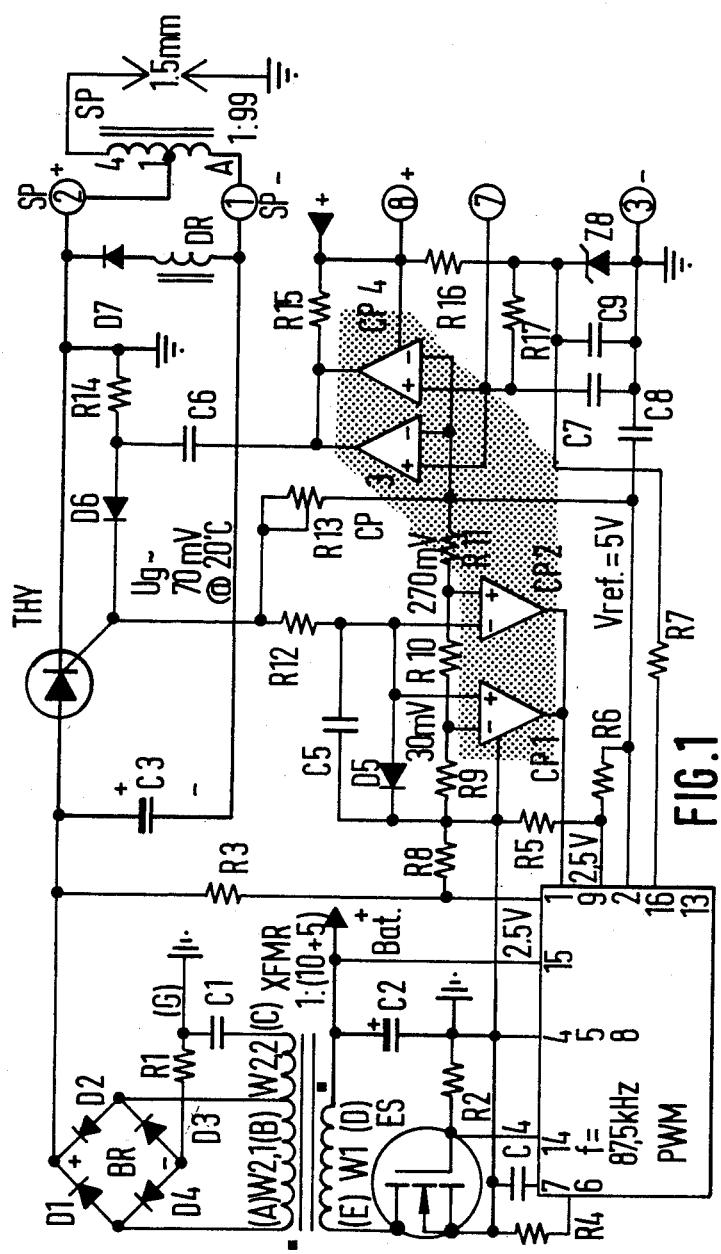
FIG. 1 is a schematic diagram of a first preferred embodiment of a DC-DC converter in accordance with the invention and illustrated in combination with a high-voltage capacitor ignition device.

The basic high-voltage capacitor ignition device depicted in FIG. 1, which is shown in combination with a first preferred embodiment of a DC-DC converter constructed in accordance with the present invention, is described in detail in the aforementioned U.S. Pat. No. 4,696,280, the specification of which is expressly incorporated by reference herein. Consequently, further unnecessary description of the components and elements of the capacitor ignition device is omitted herefrom except as necessary to disclose the present invention.

Referring to FIG. 1, the DC-DC converter of the invention comprises an electronic switch ES which is controlled by a pulse-width modulator PWM in order to feed pulses to the primary winding W1 of a transformer XFMR, this taking place here in single-ended operation. The secondary winding of the transformer is divided by a tap terminal B into a first secondary winding W2,1 and a second secondary winding W2,2. The terminals A and B of the first secondary winding W2,1 are connected to a full-wave bridge rectifier BR formed of diodes D1, D2, D3 and D4. The free terminal of the second secondary winding W2,2 is connected to ground via a capacitor C1. The DC output terminal (−) of the bridge rectifier, which carries negative potential, is also connected to ground via a resistor R1. The DC terminal (+) of the bridge rectifier, carrying positive potential, is connected to an ignition capacitor C3 which acts as the charging capacitor for the DC-DC converter. This capacitor is charged via a parallel circuit from the primary side of an ignition coil SP and a series circuit formed of a choke DR and a diode D7, the series circuit being connected to ground. A load resistor R3, which acts here as a divider resistance for the voltage control, is connected in parallel with the ignition capacitor C3.

Since the pulse generator formed essentially by the electronic switch ES, which is controlled so as to conduct intermittently, results in single-ended operation of the DC-DC converter, only one primary winding W1 is provided so that demagnetization of the transformer XFMR takes place via the first secondary winding W2,1 and the bridge rectifier BR connected thereto. The pulses produced in this connection by the demagnetization additionally charge the charging capacitor C3 via the diodes D2 and D4 of the bridge circuit BR. This alone effects an increase in the theoretical stepup ratio established by the ratio of the number of secondary to primary winding turns of the transformer by a factor of 2.4. In the case of the preferred embodiment of the DC-DC converter shown in FIG. 1, the first secondary winding W2,1 has approximately twice the number of turns that the second secondary winding W2,2 has. The stepup ratios of the first and secondary windings with respect to the primary winding W1 are selected as 1:10 and 1:5, respectively, so that the theoretical total stepup ratio from primary side to secondary side is 1:(10+5). For this stepup ratio, the charging curves for the charging capacitor C3 are shown in FIG. 5, using a 10 Hz spark frequency of the ignition device.

As indicated by the curve shown in FIG. 6 of maximum charge voltage as a function of primary-side supply voltage ($U_{bat}$), with a battery voltage $U_{bat}$ of 7 V on the primary side of the DC-DC converter there results a charge voltage on the capacitor of about 370 V when a suitable capacitance is selected for the capacitor C1. Thus, utilizing the DC-DC converter of the invention in a capacitor ignition device it remains possible to produce a sufficient ignition spark to start an internal combustion engine even in the coldest winter temperatures and correspondingly low battery voltage.

The low ohmic resistor R1 connected between the DC voltage output of the bridge rectifier BR carrying the negative potential and ground limits the initial maximum charging current pulses for the charging capacitor C3 and protects the diodes of the rectifier bridge. With the resistor R1, parasitic and thus disturbing high frequency is damped for higher output of the DC-DC converter, as a result of which the efficiency of the DC-DC converter can be further increased.

For the charge curves shown in FIG. 5 it is important, as shown in FIG. 1, that the secondary winding of transformer XFMR is divided in two to optimize matching of the DC-DC converter output to the load impedance established, in each case, by the charging capacitor. In this connection, however, it must be pointed out that the first secondary winding W2,1 should have a stepup ratio which is not substantially less than 1:10 in order to avoid overloading the bridge rectifier diodes.

In order to determine the maximum obtainable charge voltage on the charging capacitor C3, one starts from the theoretical total stepup ratio of 15. Since the capacitor C1 shown in FIG. 1 operates within the DC-DC converter as a "booster" capacitor which effects an increase in the theoretical stepup ratio by a factor of about 1.75, a total factor of increase of about 4.2 results for the theoretical stepup ratio of the transformer. Thus, with a supply voltage of 13.8 volts on the primary side of the DC-DC converter there results a maximum charge voltage of about 860 volts on the charging capacitor C3 ($13.8 \times 15 \times 4.2 = 869.4$). This calculated charge voltage can also be seen as the maximum charge voltage in the curves of FIG. 6. It should be noted that for the curves of maximum charge voltages it is insignificant in this respect whether the transformer secondary winding is or is not subdivided into two secondary windings. When the DC-DC converter is used in a high-voltage capacitor ignition device such, for example, as shown in FIG. 1, a voltage limitation of said maximum voltage is in such case of course necessary in order to prevent damage to the bridge rectifier, ignition capacitor, thyristor and other parts of the ignition device. In the particular ignition device shown in FIG. 1, this voltage limitation is provided by the pulse-width modulator PWM.

For other uses of the DC-DC converter of the invention —for example in a so-called solar battery wherein a very low output voltage of the solar cell is fed to the primary side of the DC-DC converter to charge a battery connected to the converter output—this high stepup ratio between the primary side supply voltage and the secondary side charging voltage on the charging capacitor is, on the other hand, fully utilized to advantage. The DC-DC converter is also particularly well suited for the production of the high voltage required in the supply of gas-discharge lamps.

Since synchronous adaptation of the output resistance of the DC-DC converter, with respect to the stepup ratio of the transformer, to the varying load of the charging capacitor is not possible, the subdividing of the secondary winding of the transformer into first and secondary windings with different stepup ratios offers a good approximate solution for this matching. In the embodiment of the DC-DC converter shown in FIG. 1, the charging capacitor C3 is initially charged by the low stepup ratio W2,1/W1 of preferably 10. This means that during the initial phase of the charging process the DC-DC converter is burdened with only about one-sixth of the load of a traditionally developed DC-DC converter. As charging of the capacitor C3 continues, the charging voltage follows the curves shown in FIG. 5. These curves differ depending on the selected specific capacitance value of capacitor C1. As can be clearly seen in FIG. 5 all of the curves initially follow the same steep increase in voltage up to a common "swinging point" or "knee" which is reached after about 0.6 ms. with a charge voltage of about 160 volts. Up to this "knee", only the low theoretical stepup ratio W2,1/W1=ü=10 is active, after which the stepup ratio rises continuously. One thus obtains a multi-step charging which, with a final theoretical total stepup ratio of 15, in fact reaches an effective stepup ratio of about 60. The result is a quadrupling of the voltage at the output of the DC-DC converter as compared with the output voltage of a traditional DC-DC converter which is determined solely by the theoretical stepup ratio of the transformer.

The improvement in efficiency of the DC-DC converter also exceeds all expectations. In the embodiment shown in FIG. 1, within a wide spark frequency range which is specific to the device, an efficiency of about 60% is realized. This means an improvement in efficiency as compared with traditional DC-DC converters by a factor of approximately 1.5 in the case of a partial load and of approximately 2 for a full load. These values refer to a preferred capacitance of 3.3 nF for the capacitor C1 in the high-voltage capacitor ignition device illustrated in FIG. 1. As can be noted from FIG. 5, upon an increase in the spark frequency—i.e. as t becomes smaller—the charge voltage gradually decreases down to the common "knee" so as to avoid, in the desired manner at constant high efficiency, an excessive rise in power throughput of the device.

Although not shown in the drawing, the capacitor C1 can also be omitted, in which case the free terminal C of the second secondary winding W2,2 in FIG. 1 remains unconnected. In such a modified embodiment of the invention capacitor C1 is replaced by the winding-layer capacitance between the second secondary winding W2,2 and the primary winding W1 and/or ground or a shielding winding. The lowermost curve in FIG. 5 of the charge voltage on the charging capacitor is associated with this modified embodiment of the FIG. 1 illustrated DC-DC converter.

Figure 4:
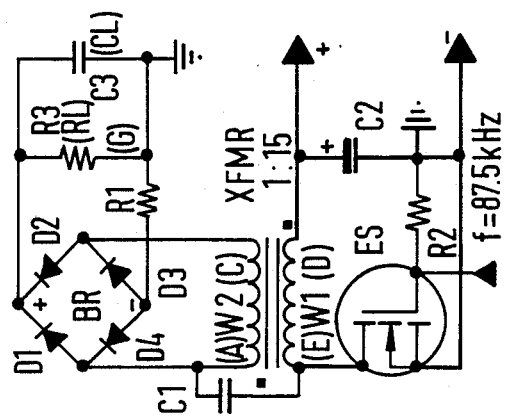
FIGS. 2, 3 and 4 are schematic diagrams of additional embodiments of a DC-DC converter in accordance with the invention.
Figure 3:
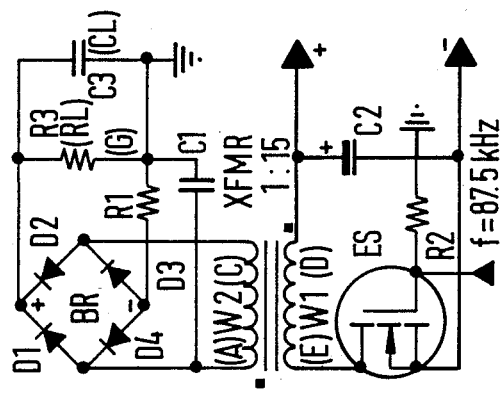
Figure 2:
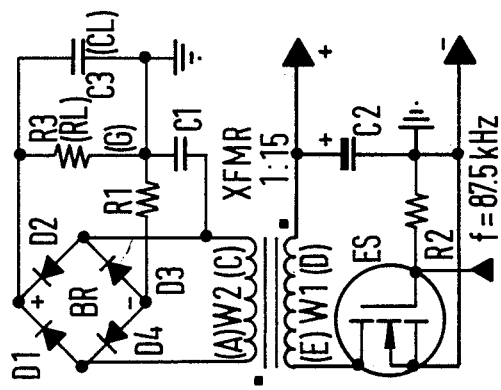

The further embodiments of the DC-DC converter of the invention, shown in FIGS. 2 to 4 apart from the ignition device illustrated in FIG. 1, differ from the FIG. 1 embodiment of the DC-DC converter by the provision of different connecting variants for capacitor C1 and by providing only a single, untapped secondary winding W2. Despite these modifications, the DC-DC converters there shown still realize an efficiency of about 60% in the case of a partial load and of about 45% for a full load.

As previously noted, the disclosed embodiments of the DC-DC converter of the invention are not limited to use in high-voltage capacitor ignition devices. Since with substantial ohmic loading of the converter an efficiency of about 75% can be obtained, the inventive converter can be used universally wherever a strongly variable high voltage load is to be supplied with high efficiency. In this respect, for different applications different theoretical stepup ratios of the transformer can be selected, with the maximum charging voltages at the charging capacitor of the DC-DC converter (as shown in FIG. 6) then resulting as a function of the primary-side supply voltage $U_{bat}$.

As already explained with reference to FIG. 5, depending on the use and the particular design, for example, of capacitor-ignition devices, different courses of the charging curves for the charging capacitor can be selected. This is accomplished by variation of the capacitance of capacitor C1. It is accordingly preferred that the DC-DC converter of the invention be constructed to permit ready interchangability of capacitor C1, thereby permitting serial substitutions of various capacitor values for adjusting the characteristics of the DC-DC converter without requiring additional alterations in the circuit.

Due to the extremely high voltage yield on the secondary side of the DC-DC converter, the transformer XFMR can also be manufactured in a simple and inexpensive manner. The technical data for such a transformer may, by way of example, be as follows:

Core: RM 14; 3B8,OL;

$$W2,1 = 90 \times (0.35) \text{ two layers};$$

$$W2,2 = 45 \times (0.35) \text{ one layer};$$

$$W1 = 9 \times (2 \times 0.85; \text{bifilar}) \text{ one layer};$$

The winding W2,2 can in this connection be implemented using the same wire as winding W2,1 in one continuous stroke without the need for a cumbersome change of wire. Thus, the manufacture of the transformer is extremely simple. This is a substantial advantage since transformers represent probably the most expensive part of traditional DC-DC converters, so that a great simplification of this component results in a considerable reduction in the cost of the DC-DC converter. In view of the small number of winding turns, furthermore, the space required is reduced by approximately one-half as compared with previous transformers. This enables, in addition to the simplified winding of the transformer, the realization of other advantages such as a reduction in the structural height of the transformer by half of the previous necessary winding width (18.4mm)—that is, a reduction to approximately 9 mm. Furthermore the next smaller core size can possibly be selected for the transformer with a concurrent increase in the frequency of the DC-DC converter. With the same effective magnetic cross-sectional area, the magnetic path length can be considerably reduced and the magnetic volume is also decreased. This benefits the operating efficiency of the transformer and, therefore, the efficiency of the entire DC-DC converter.

For the embodiments of the DC-DC converter of the invention, illustrated in the drawing figures, the following component values may be used:

R1 = 7 to 10 ohms, with a preferred value of 10 ohms;
C1 = 1 to 10 nF, with a preferred value of 3.3 nF;
ü(turns ratio) = 14 to 16, with a preferred value of 15, broken down into separate secondary windings of 10 and 5.

In selecting the electronic switch ES it should be understood that the switch must be capable of handling voltage peaks of about four times the value of the primary-side supply voltage $U_{bat}$ which appears across the primary winding W1 of transformer XFMR.

While there have been shown and described and pointed out fundamental novel features of the invention as applied to preferred embodiments thereof, it will be understood that various omissions and substitutions and changes in the form and details of the device illustrated and in their operation may be made by those skilled in the art without departing from the spirit of the invention. It is the intention, therefore, to be limited only as indicated by the scope of the claims applied hereto.

What is claimed is:

1. A DC-DC converter fed by a pulse generator, comprising:
   a transformer having a primary winding connected to the pulse generator and a secondary winding;
   a charging capacitor;
   rectifier means having an input connected to said secondary winding and an output connected to said charging capacitor;
   said converter being operable in single-ended operation and said secondary winding connected to said rectifier means providing demagnetization of said transformer; and
   capacitor means for defining a capacitance and connecting said secondary winding to a circuit connection of low potential, said capacitor means having a capacitance that is very small as compared with the capacitance of said charging capacitor.

2. A DC-DC converter in accordance with claim 1, wherein the ratio of the capacitance of said capacitor means to the capacitance of said charging capacitor is less than approximately 1:50.

3. A DC-DC converter in accordance with claim 1, further comprising a resistor connecting a negative output of said rectifier means to ground.

4. A DC-DC converter in accordance with claim 3, wherein said capacitor means connects a terminal of said secondary winding to ground.

5. A DC-DC converter in accordance with claim 3, wherein said capacitor means connects said secondary winding to a low potential terminal of said primary winding.

6. A DC-DC converter in accordance with claim 1, wherein said secondary winding comprises first and second secondary windings, said first secondary winding being connected to said rectifier means and said second secondary winding being connected to said capacitor means.

7. A DC-DC converter in accordance with claim 6, wherein said second secondary winding has approximately one-half as many turns as said first secondary winding.

8. A DC-DC converter in accordance with claim 7, wherein said capacitor means comprises a winding-layer capacitance between said second secondary winding and at least one of said primary winding and ground, and wherein said second secondary winding includes two terminals, one of said terminals being connected to said first secondary winding.

9. A DC-DC converter in accordance with claim 6, wherein said capacitor means comprises a winding-layer capacitance between said second secondary winding and at least one of said primary winding and ground, and wherein said second secondary winding includes two terminals, one of said terminals being connected to said first secondary winding.

10. A DC-DC converter in accordance with claim 6, wherein said capacitor means comprises a capacitor.

11. A DC-DC converter in accordance with claim 6, wherein said capacitor means connects said second secondary winding to ground.

12. A DC-DC converter in accordance with claim 1, wherein said capacitor means comprises a capacitor.

13. A DC-DC converter in accordance with claim 1, wherein said capacitor means connects a terminal of said secondary winding to ground.

14. A DC-DC converter in accordance with claim 1, wherein said capacitor means connects said secondary winding to a low potential terminal of said primary winding.

15. A DC-DC converter in accordance with claim 1, wherein said capacitor means has a capacitance in the range of approximately 680 pF to 10 nF.

16. A DC-DC converter in accordance with claim 1, wherein said capacitor has a capacitance of approximately 3.3 nF.

17. A DC-DC converter in accordance with claim 1, wherein the transformation ratio between said primary and secondary windings of said transformer is in the range of approximately 14 to 16, and is preferably approximately 15.

18. A high voltage capacitor discharge ignition device having a pulse generator and a high voltage power supply in the form of a DC-DC converter, said converter comprising:
   a transformer having a primary winding connected to the pulse generator and a secondary winding;
   a charging capacitor;
   rectifier means having an input connected to said secondary winding and an output connected to said charging capacitor;
   said converter being operable in single-ended operation and said secondary winding connected to said rectifier means providing demagnetization of said transformer; and
   capacitor means for defining a capacitance and connecting said secondary winding to a circuit connection of low potential, said capacitor means having a capacitance that is very small as compared with the capacitance of said charging capacitor.

* * * * *